Feb. 5, 1946.   B. F. LANGER ET AL   2,394,079
STRAIN MEASURING SYSTEM
Filed May 5, 1944
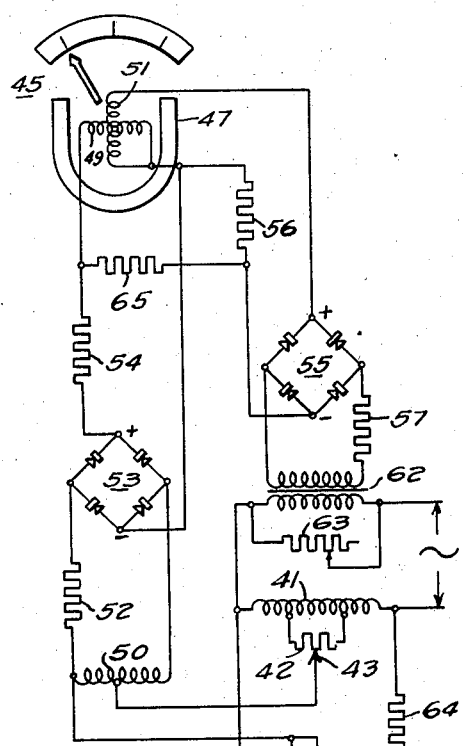
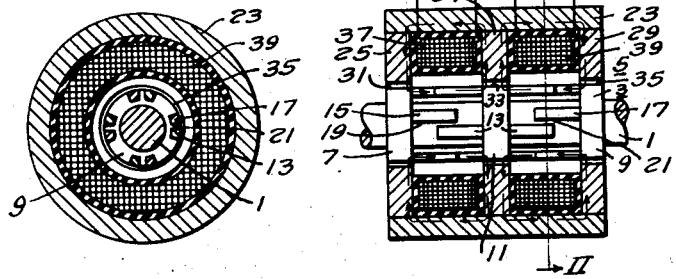
WITNESSES:
INVENTORS
Bernard F. Langer and
Kenneth L. Wommack.
BY
Paul C. Friedemann
ATTORNEY Patented Feb. 5, 1946

2,394,079

UNITED STATES PATENT OFFICE 2,394,079

STRAIN MEASURING SYSTEM

Bernard F. Langer, Squirrel Hill, and Kenneth L. Wommack, Wilkinsburg, Pa., assignors to Westinghouse Electric Corporation, East Pittsburgh, Pa., a corporation of Pennsylvania Application May 5, 1944, Serial No. 534,222

8 Claims. (Cl. 73—88)

The present invention relates, generally, to systems for continuously indicating or measuring the deflection or strain of a member subject to a stress.

More particularly, the present invention relates to a system of the character mentioned which employs a magnetic type of strain gauge to produce a voltage or current or a change of voltage or current which is indicative of the deflection being measured, the strain gauges in most applications being secured to the member being deflected so that the strain gauge elements may be subjected to movements equivalent to the deflections of the member.

This invention is closely related to a copending application of B. F. Langer, the inventor in this application, Serial No. 466,147, filed November 19, 1942, entitled "Strain measuring system," now U. S. Patent No. 2,354,129, granted July 18, 1944, to a copending application of B. F. Langer and T. E. Browne, Jr., Serial No. 466,149, filed November 19, 1942, entitled "Strain measuring system," now U. S. Patent No. 2,354,130 granted July 18, 1944, and to another of B. F. Langer's copending applications, Serial No. 534,223 filed on the same date as this application.

The present invention embodies the fundamental principles disclosed in the above-mentioned copending applications and differs therefrom in the matter of circuit details which measurably improve the performance of the strain measuring system when operating under adverse conditions.

The deflection or strain measuring system as hereinafter described and illustrated in the drawing is specifically adapted for measuring the torsional deflections or twist of a shaft subject to torque, for the purpose of indicating the torque being transmitted by the shaft. It is not to be construed, however, that the invention is limited to this application alone, since other forms of strain gauges may be substituted for that illustrated to measure the deflection or strain of a member subject either to tension or compression loading. For an example, reference may be had to the strain gauge illustrated in Patent 2,231,702, S. L. Burgwin et al. It will be apparent, however, to one skilled in the art that the specific invention illustrated in the drawing for measuring the torque of a shaft provides accurate torque indication in a degree hitherto unobtainable.

A principal object of the present invention is to provide a system for measuring the deflection or strain of a member subject to a stress which shall function simply and efficiently and have a minimum number of parts.

Another object of the present invention is to provide a deflection measuring system of the character referred to which shall compensate for voltage fluctuations of the source of applied potential.

Another object of the present invention is to provide a deflection or strain measuring system of the character referred to which shall be insensitive to changes in ambient temperature.

Another object of the present invention is to provide a strain gauge control circuit in which a substantially linear relationship between the quantity or voltage to be measured and the current in the indicating instrument coils is obtained.

A further object of this invention is to provide a strain measuring system which is calibrated for zero strain. That is, one in which the calibration line passes through zero for zero strain.

A still further object of this invention is to provide a strain measuring system of the character described in which the electrical losses are equalized among the several circuits.

Other objects and advantages will become more apparent from a study of the following specification when considered in conjunction with the accompanying drawing, in which:

Figure 1 illustrates a torque measuring system embodying the principles of this invention; and Fig. 2 is a sectional view taken on the line II—II of the strain gauge of Fig. 1.

The specific strain gauge or torque measuring device schematically illustrated in the drawing is described in detail in a copending application of B. F. Langer and F. W. Godsey, Jr., Serial No. 458,378, filed September 15, 1942, entitled "Torque measuring devices for shafts" and only such description which is necessary for a complete understanding of the construction and operation of the strain gauge will be included in this specification.

Referring now to Figs. 1 and 2 of the drawing, numeral 1 denotes a shaft the torque of which is to be measured; numeral 3 denotes a rotor assembly secured to the shaft and which in effect forms the armature member of the strain gauge; and numeral 5 denotes an annular stationary member which is concentrically positioned about the rotor assembly 3 and which in effect forms the core assembly of the strain gauge.

The rotor assembly 3 comprises a pair of axially spaced torque rings 7 and 9 secured to the shaft on bushings (not shown) of nonmagnetic material so that a circulating magnetic flux will not include the shaft if the shaft is made of steel or other magnetic material. Centrally disposed between the torque rings 7 and 9 is a third ring 11 termed a reference ring likewise supported and secured to the shaft on a bushing (not shown) of nonmagnetic material. The three rings thus secured to the shaft are so axially spaced and supported that a known gauge-length of shaft is included therebetween. The reference ring 11 has secured thereto a plurality of axially extending fingers 13 which extend axially on each side of the ring in the same axial plane. Each of the torque rings 7 and 9 has a plurality of axially extending fingers 15 and 17 which are of sufficient length to overlap the extremities of the fingers 13 associated with reference ring 11. The confronting faces of the co-operating fingers of the three rings are so positioned during assembly that a small air gap is included therebetween and the above-described assembly is such that, for example, if torque were assumed to be transmitted from left to right of the shaft in a clockwise direction, torsional deflections of the shaft between the torque ring 7 and the reference ring 11 would so displace the fingers 15 relative to the fingers 13 cooperating therewith that the air gap 19 formed therebetween would be decreased and the torsional deflections of the shaft between reference ring 11 and torque ring 9 would so displace the fingers 17 relative to the fingers 13 co-operating therewith that the air gap 21 formed therebetween would be increased.

The stationary member 5 comprises an outer annular shell 23 having three ring elements 25, 27, and 29 axially spaced and secured therewithin, each of which is positioned to be included in a transverse plane defined by one of the shaft ring elements. The inner bores of the ring elements are of such diameter that small annular air gaps 31, 33, and 35 are formed between the peripheries of the concentrically positioned confronting faces. Included within the two annular recesses formed between the axially spaced rings 25, 27, and 29 are a pair of annular coils 37 and 39 which are each connected as one leg in a conventional bridge circuit. The other two legs of the bridge circuit are formed by the inductor 41, a portion of which is shunted by a resistor 42. Bridge balance may be obtained or approached by adjusting the slider 43 along the resistor.

Upon suitable energization of the coils from the source of alternating current connected across the input terminals of the bridge circuit and indicated generally by the sinusoidal wave, a flow of alternating magnetic flux may be induced to flow in the stationary member 5 and the rotor assembly 3 in the instantaneous directions indicated by the arrows and for zero torque of the shaft the bridge circuit may be adjusted to a balanced condition, assuming perfect matching of the coils and the magnetic circuits of the strain gauge, by movement of the resistor slider 43 across the resistor 42. It may now, therefore, be seen that upon torsional deflection of the shaft due to clockwise torque from left to right of the shaft as previously described, the air gaps 19 will be decreased while the air gaps 21 will be increased to substantially proportionally change the values of the alternating magnetic fluxes associated with each of the coils. Thus a voltage in one coil will be increased while a voltage in the other coil will be decreased to cause a voltage difference to appear between the coils. This voltage difference is therefore measurable across the output terminals of the bridge circuit.

The indicating instrument 45 is preferably of the cross-coil type and is illustrated diagrammatically. It comprises a stationary permanent magnet 47 and a movable armature positioned to be influenced by the field of the magnet. The armature of the instrument includes a pair of coils 49 and 51 mounted at an angle with respect to each other; the arrangement being such that both coils control the movements of the pointer to provide an indication corresponding to the ratio of the effects produced by the currents in the coils. Interconnecting the coil 49 of the indicating instrument with the output terminals of the bridge circuit is a circuit comprising a bridge rectifier 53 having its input terminals connected across the inductor element 50 which in turn has a tapped portion thereof connected in series with the adjustable resistor 61 across the output terminals of the bridge circuit; its positive terminal through a resistor 54 is connected to one side of the coil 49 and its negative terminal is connected to the other side of coil 49. A series resistor 52 is connected on the alternating-current side of the rectifier 53, for the purpose of providing a high circuit resistance which is preferably considerably higher than that of the rectifier network or bridge. The second coil 51 of the indicating instrument is connected to the source of alternating potential by a circuit similar to that for the coil 49 including a bridge rectifier 55 having its input terminals across the secondary of a partially saturated transformer 62, the primary of which is in series circuit in one of the supply conductors connected to the source of alternating potential, its negative terminal connected through a resistor 56 to one side of the coil 51 and its positive terminal connected to the other side of the coil 51. A series resistor 57 is provided in the circuit connecting the bridge rectifier to the secondary winding of the partially saturated transformer and like the resistor 52 this resistor is preferably of a much higher resistance value than the rectifier network or bridge 55.

Series resistor 54 is provided for the purpose of increasing the load on the rectifier 53 thereby increasing the voltage across the rectifier to a point where the rectifier operation is more stable. For example, without a resistance load in the instrument coil circuit the rectifier output voltage may be only about three-tenths of one volt, at this low voltage it has been found that the voltage is subject to considerably larger percentage fluctuations than at higher voltages. The resistor 56 functions in a manner similar to that of the resistor 54 and in addition its voltage or a portion thereof determined by the value of a resistor such as 65 is applied across the forward coil 49 of the measuring instrument in opposition to that supplied by the rectifier 53. This is necessary since in some installations it is not possible to completely balance the bridge circuit by simple adjustment of the resistor slider 43.

It will be noted upon an inspection of Fig. 1 that both coils 49 and 51 of the indicating instrument 45 are subject to voltage application from the same source of alternating potential. Since, as previously mentioned, the instrument provides an indication corresponding to the ratio of the effects produced by the currents circulating in the coils, variations in the source of alternating potential, providing the electrical losses in the two circuit branches are equal, will equally affect both coils of the instrument due to the circuit arrangement, and as a consequence thereof produce no change of indication as would be the case were only one of the coils affected.

In many instances it is not possible to so match the two circuit branches that the electrical losses in each are equal, for this reason the partially saturated transformer 62 is provided. By properly designing this transformer to operate at a certain degree of magnetic saturation of the iron, the losses in coupling of the primary and secondary windings thereof may be made substantially equal to the losses in the circuit including the strain gauge bridge circuit. Thus fluctuations in the source of applied potential produce substantially equal voltage changes across the two instrument coils. The adjustable shunting resistor 63 provides a convenient means for regulating the voltage applied to the reverse coil 51 of the instrument and at the same time provides a convenient means for effecting minor changes in the degree of saturation of the transformer 62.

It is a well known fact that copper oxide rectifiers have resistance characteristics which vary with the current passing through them; the resistance characteristics also vary with changes in temperature. Such variations are, of course, very undesirable, since any variation from a linear relationship of the voltage supply to the current flowing in the indicating instrument coils will produce a false indication of the quantity to be measured on a linear scale instrument. In order to compensate or correct for this nonlinear resistance characteristic, the resistors 52 and 57 are provided in each of the rectifier circuits. The principle applied here is to provide sufficiently high circuit resistances that any change in rectifier resistance resulting from the aforenamed conditions, will represent only a negligible percentage in the total circuit resistance. Thus the current variation resulting from such resistance changes are so small that no readable scale deflection is produced on the indicating instrument. The effect is such as to provide practically linear flows of current in the coil circuits of the indicating instrument. This expedient for obtaining linear flows of current is considered an improvement over the rectifier shunting circuits disclosed for example in the applicants' copending application Serial No. 466,147, since the high resistance circuits herein disclosed depend less upon the excellence of the rectifier networks for linearity of current flows for the reason that the rectifier resistances are swamped in high resistance circuits.

Resistors such as 52 and 57 are preferably of a fairly high grade, that is, accurate to within small percentages. Since such resistors are ordinarily not obtainable with provisions for adjustment, any resistance adjustment necessary for proper impedance matching of the two circuits or for other reasons, is most conveniently made on the low impedance or bridge terminal side of the autotransformer. The resistor 61 provided for this purpose may thus be of a fairly small ohmic value and yet be measurably effective in making the necessary adjustments.

While the provision of the high resistance rectifier circuits provides a very simple means for obtaining linear current flows, it is apparent that a larger amount of energy must be supplied to the rectifier networks. In the case of the rectifier 55 supplying the reverse coil 51 of the instrument, this energy supply is conveniently regulated by the partially saturated transformer 62. In the case of the rectifier energized by the electrical unbalance of the bridge circuit, this energy supply is not so conveniently regulated, since the degree of electrical unbalance of the bridge is determined by the strain gauge, sensing the shaft torque. It is possible, however, to utilize the available electrical unbalance very efficiently by providing the inductor element 50, which may be an autotransformer or the like, for the purpose of matching the impedances of the strain gauge bridge circuit and the instrument coil circuit. Thus the maximum available energy is transmitted to the instrument coil 49.

In many cases, for example, due to manufacturing tolerances in machining the rotor elements, adjusting air gaps and the like, the strain gauge may not be electrically symmetrical. In such cases it has been found advantageous to provide a phase balancing resistor such as illustrated at 64. This resistor may be disposed in either the left or right bridge circuit conductor to equalize the bridge currents. By properly selecting this resistor, phase balance may be achieved over the entire range of shaft deflections.

There is another possible use for the phase-balancing resistor 64. If made of wire with a high temperature coefficient of resistance, such as nickel, it can produce a zero shift in the calibration curve with temperature. This is sometimes useful in compensating for other, undesirable, zero shifts produced by temperature. It can be placed on either side of the bridge, depending upon the direction in which the shift is to occur. It can be attached either adjacent the strain-gauge pickup or adjacent the inductor and variable shunting resistor forming the other two legs of the bridge circuit, which elements are usually located in a control box remotely located from the strain gauge, depending upon where the origin of the temperature zero shift is located.

The operation of the above-described apparatus may be set forth as follows: Upon transmission of torque by the shaft, the air gaps 19 and 21, as previously described, will change, one increasing while the other decreases depending upon the direction of the torsional deflection of the shaft. This changes the values of the alternating magnetic fluxes linked with each of the coils to cause a corresponding change in voltage in each coil. Thus a voltage difference is caused to appear across the output terminals of the bridge circuit and a voltage proportional to this voltage difference or unbalance of the bridge circuit is impressed across the coil 49 of the indicating instrument.

The coil 51 of the indicating instrument produces a flux component proportional to the applied alternating potential of the secondary winding of the transformer 62 and the coil 49 produces a flux component at a right angle with respect to the flux component of the coil 51 proportional to the difference of voltage or unbalance existing across the output terminals of the bridge circuit. The resultant of these two flux components causes the armature or crossed coil assembly of the instrument to rotate to a position in which the resultant lines up with the magnetic field produced by the permanent magnet 47. Since both flux components depend upon the source of alternating potential and the electrical losses in the two circuit branches are substantially equal, the effect of variations of the source of alternating potential is eliminated since the flux resultant with respect to the instrument armature depends only upon the relative magnitudes of the flux components. The deflection of the pointer of the instrument 45 is, therefore, in view of the compensation for the variations in the source of alternating potential and the previously described compensation for the non-linear resistance characteristics of the bridge rectifiers, entirely dependent upon the degree of unbalance of the bridge circuit which unbalance being directly proportional to the torsional deflection or torque of the shaft provides an indication accurately indicative of the torque being transmitted.

The foregoing disclosure and the showings made in the drawing are merely illustrative of the principles of this invention and are not to be interpreted in a limited sense. The only limitations are to be determined from the scope of the appended claims.

We claim as our invention:

1. In a system for indicating a mechanical displacement, the combination of, an electrical bridge circuit, means for supplying alternating current to the bridge circuit, means forming a part of the bridge circuit and responsive to a mechanical displacement for producing an electrical change in the bridge circuit, an electrical measuring instrument having a first and a second internal circuit providing an indication corresponding to the ratio of the effects produced by the currents in said internal circuits, a first circuit including a rectifier network interconnecting the first internal circuit of said instrument and the electrical bridge circuit so that said first internal circuit of said instrument has a voltage applied thereacross corresponding to an electrical change of said bridge circuit, a second circuit including a rectifier network electrically connected to said second internal circuit of said instrument, and a partially saturated transformer interconnecting said second circuit and said means for supplying alternating current, for introducing electrical losses in said second circuit similar to those of said first circuit.

2. In a system for indicating a mechanical displacement, the combination of, an electrical bridge circuit, means for supplying alternating current to the bridge circuit, means forming a part of the bridge circuit and responsive to a mechanical displacement for producing an electrical change in the bridge circuit, an electrical measuring instrument having a first and a second internal circuit providing an indication corresponding to the ratio of the effects produced by the currents in said internal circuits, a first circuit including a rectifier network interconnecting the first internal circuit of said instrument and the electrical bridge circuit so that said first internal circuit of said instrument has a voltage applied thereacross corresponding to an electrical change of said bridge circuit, a second circuit including a rectifier network electrically connected to said second internal circuit of said instrument, a partially saturated transformer interconnecting said second circuit and said means for supplying alternating current, and circuit means interconnecting said first and second circuits for providing a biasing voltage on said first internal circuit of said instrument.

3. In a system for indicating a mechanical displacement, the combination of, an electrical bridge circuit, means for supplying alternating current to the bridge circuit, means forming a part of the bridge circuit and responsive to a mechanical displacement for producing an electrical change in the bridge circuit, an electrical measuring instrument having a first and a second internal circuit providing an indication corresponding to the ratio of the effects produced by the currents in said internal circuits, a first circuit including a rectifier network interconnecting the first internal circuit of said instrument and the electrical bridge circuit so that said first internal circuit of said instrument has a voltage applied thereacross corresponding to an electrical change of said bridge circuit, means for matching the impedances of said electrical bridge circuit and said first circuit, a second circuit including a rectifier network electrically connected to said second internal circuit of said instrument, and a partially saturated transformer interconnecting said second circuit and said means for supplying alternating current.

4. In a system for indicating a mechanical displacement, the combination of, an electrical bridge circuit, means for supplying alternating current to the bridge circuit, means forming a part of the bridge circuit responsive to a mechanical displacement for producing an electrical change in the bridge circuit, an electrical measuring instrument having a first and a second internal circuit providing an indication corresponding to the ratio of the effects produced by the currents in said internal circuits, a first circuit including a rectifier network electrically connected to the first internal circuit of said instrument, an element having inductance properties, said element having tapped portions thereof connected across said bridge circuit to be energized according to the electrical change thereof and tapped portions connected across said first circuit, for matching the impedances of the first circuit and the bridge circuit; a second circuit including a rectifier network electrically connected to the second internal circuit of said instrument, and a partially saturated transformer connecting said second circuit to said means for supplying alternating current.

5. In a system for indicating a mechanical displacement, the combination of, an electrical bridge circuit, means for supplying alternating current to the bridge circuit, means forming a part of the bridge circuit responsive to a mechanical displacement for producing an electrical change in the bridge circuit, an electrical measuring instrument having a first and a second internal circuit providing an indication corresponding to the ratio of the effects produced by the currents in said internal circuits, a first circuit including a rectifier network electrically connected to the first internal circuit of said instrument an element having inductance properties, said element having tapped portions thereof connected across said bridge circuit to be energized according to the electrical change thereof and tapped portions connected across said first circuit, for matching the impedances of the first circuit and the bridge circuit; a second circuit including a rectifier network electrically connected to the second internal circuit of said instrument, a partially saturated transformer connecting said second circuit to said means for supplying alternating current, and circuit means interconnecting said first and second circuits for providing a biasing voltage on said first internal circuit of said instrument.

6. In a system for indicating a mechanical displacement, the combination of, an electrical bridge circuit, means for supplying alternating current to the bridge circuit, means forming a part of the bridge circuit responsive to a mechanical displacement for producing an electrical change in the bridge circuit, an electrical measuring instrument having a first and a second internal circuit providing an indication corresponding to the ratio of the effects produced by the currents in said internal circuits, a first circuit including a rectifier network electrically connected to the first internal circuit of said instrument an element having inductance properties, said element having tapped portions thereof connected across said bridge circuit to be energized according to the electrical change thereof and tapped portions connected across said first circuit for matching the impedances of the first circuit and the bridge circuit; a second circuit including a rectifier network electrically connected to the second internal circuit of said instrument, a partially saturated transformer connecting said second circuit to said means for supplying alternating current, a resistor connected in series in said second circuit, and a circuit means connecting the first internal circuit of said instrument across said resistor.

7. In a system for indicating a mechanical displacement, the combination of, an electrical bridge circuit, means for supplying alternating current to the bridge circuit, means forming a part of the bridge circuit responsive to a mechanical displacement for producing an electrical change in the bridge circuit, an electrical measuring instrument having a first and a second internal circuit providing an indication corresponding to the ratio of the effects produced by the currents in said internal circuits, a first circuit including a rectifier network electrically connected to the first internal circuit of said instrument an element having inductance properties, said element having tapped portions thereof connected across said bridge circuit to be energized according to the electrical change thereof and tapped portions connected across said first circuit, for matching the impedances of the first circuit and the bridge circuit; a second circuit including a rectifier network electrically connected to the second internal circuit of said instrument, a partially saturated transformer connecting said second circuit to said means for supplying alternating current, a resistor connected in series in said second circuit, circuit means connecting the first internal circuit of said instrument across said resistor, and means in said first and second circuits for producing high electrical resistances therein whereby the resistances of said rectifier networks represent a small percentage of the total resistance of each of said first and second circuits.

8. In a system for indicating a mechanical displacement, the combination of, an electrical bridge circuit, means for supplying alternating current to the bridge circuit, means forming a part of the bridge circuit and responsive to a mechanical displacement for producing an electrical change in the bridge circuit, an electrical measuring instrument having a first and a second internal circuit providing an indication corresponding to the ratio of the effects produced by the currents in said internal circuits, a first circuit including a rectifier network interconnecting the first internal circuit of said instrument and the electrical bridge circuit so that said first internal circuit of said instrument has a voltage applied thereacross corresponding to an electrical change of said bridge circuit, a second circuit including a rectifier network electrically connected to said second internal circuit of said instrument, a partially saturated transformer interconnecting said second circuit and said means for supplying alternating current, circuit means interconnecting the first and second circuits for providing a biasing voltage on the first internal circuit of said instrument, and a resistor in each of said first and second circuits for providing high electrical resistances therein whereby the resistances of said rectifier networks represent negligible percentages of the total resistance of each of said first and second circuits.

BERNARD F. LANGER.
KENNETH L. WOMMACK.